United States Patent Office 3,424,648
Patented Jan. 28, 1969

---

3,424,648
FILMS OF LAMINATED PROTEIN
Harland H. Young, Western Springs, Ill., assignor to Swift & Company, Chicago, Ill., a corporation of Illinois
No Drawing. Filed May 11, 1964, Ser. No. 366,655
U.S. Cl. 161—214             5 Claims
Int. Cl. B32b 9/04, 15/08

ABSTRACT OF THE DISCLOSURE

Film material comprising laminates of non-bonded protein fabrics or felts superficially bonded to continuous proteinaceous film, said laminates being substantially impermeable to high fugacity gases. Laminates containing metallic foil are also set forth as well as methods for forming the various laminates.

---

This invention relates to the manufacture of films and laminates and to the process of preparing such films and laminates. More particularly, the invention concerns the production of flexible sheets or films of proteins which are substantially impermeable to high-fugacity gases. The invention also concerns the production of a series of laminates having characteristics suitable for the preparation of special diaphragms or membranes which are extremely flexible at cryogenic temperatures.

Film materials have found extensive use in the space industry. In space craft, for example, an ever-increasing supply of film-forming materials, which will function at the temperatures of liquid hydrogen, liquid oxygen, liquid nitrogen and the like, is required. However, some films, while impermeable to high-fugacity gases, are greatly weakened when exposed to ultraviolet or other radiation. Such films frequently become brittle when exposed to light for a prolonged period of time. For example, one of the cheapest films, polyethylene, has poor gas impermeability, except for moisture, and is very susceptible to radiations and light degradation. Saran, on the other hand, has outstanding impermeability to oxygen, but in many other respects, exhibits poor light and radiation resistance.

In special areas of use, such as liners for receptacles containing cryogenic fuels used in space craft, the film materials must possess properties not required under conventional conditions. In this special field, namely, cryogenic applications, the material must exhibit excellent impermeability to hydrogen and oxygen. Laminates of various synthetic, fibrous or plastic sheet materials are somewhat impermeable to high fugacity gases. However, they are extremely brittle at temperatures of liquid hydrogen, liquid oxygen, and the like. It is therefore apparent that a commercially available film material, capable of functioning adequately at cryogenic temperatures, would be a most welcome advance in the art.

Accordingly, it is an object of this invention to provide a film which is substantially impermeable to gases and which remains flexible and maneuverable at cryogenic temperatures.

It is also an object of this invention to provide flexible laminates and methods for the production of said flexible laminates.

Additional objects, if not specifically set forth herein, will be readily apparent to those skilled in the art from the detailed description of the invention which follows.

In general, this invention relates to film material, and more especially to film material having good flexibility at cryogenic temperatures. By the term "cryogenic," it is meant the temperature below the liquefaction temperature of the high-fugacity gases, namely, oxygen, nitrogen, and hydrogen. As a lower limit, the temperature will approach absolute zero (minus 273° C.). However, as a practical lower limit, one may consider the liquefication temperature for helium, which is approximately minus 269° C. In addition to the excellent flexibility, the films and laminates of this invention exhibit unexpectedly excellent impermeability toward gases of high fugacity. For example, the instant laminated films are approximately six to seven times more impermeable to hydrogen than polyester films such as Mylar. When vigorously flexed at exceedingly low temperatures, the thin layer of laminated material, although minutely cracked, adheres so well to the supporting fibrous structure that substantial gas impermeability is retained. Furthermore, film materials prepared in accordance with the teachings of this invention retain their high impermeability to gases even when highly plasticized with polyols, such as glycerine for use at more normal temperatures. Also of importance is the fact that the instant film material has high strength and is not weakened, to any great extent, by exposure to ultraviolet and other radiation.

The flexible films and laminates of this invention have particular utility as membranes or diaphragms when used to force cryogenic fuels out of receptacles by means of a bellows effect. The membranes of this invention, which by alternative expansion and contraction draw in a gas (helium) through a valve or orifice and expel it through a tube or container, exhibit superior flexibility at cryogenic temperatures.

More specifically, in carrying out the invention, a sheet of non-bonded, woven or non-woven fabric made of natural protein fibers is mated and superficially bonded to a continuous film of a proteinaceous material. In this conneciton, superficial bonding means bonding affecting only the surface and not penetrating below to any extent. In mating the non-bonded protein fabric, care is taken so as to not saturate the fabric with the continuous film of proteinaceous material. If the layer comprising the continuous film of proteinaceous material penetrates enough to bond the fibers, then essentially all flexibility will be lost at cryogenic temperatures. It is therefore an essential feature of this invention that the gelled continuous film be applied to the fabric in such a way that a minimum amount of penetration is effected. This is accomplished by the absence of any bonding or adhesive agents and the films and laminates are formed by placing one layer above the other and pressing the layers together.

By "non-bonded," woven or non-woven fabric made of natural protein fibers, it is meant to include either woven fabrics or non-woven fabrics such as felts wherein no bonding agent is employed other than the intermeshing of the fibers themselves. An example of a non-woven material is leather. Other materials include woven fabrics or felts made of wool, silk, hair, feather fibers, or any combination thereof.

The fabric materials may be in either woven or felt condition and should be substantially free of any sizing or bonding agent which would be brittle at cryogenic temperatures. The raw materials should be as free as possible from any fat, oil, lubricant, resin, or surfactant. This is effected by thoroughly cleaning the raw material fiber prior to weaving, knitting, felting, etc., or by suitable cleaning of the fabric after it is woven or felted. Cleaned raw material is meant to be that which contains less than about ½% foreign matter, i.e. fat, oil, lubricant, bonding agent, etc. In the case of leather, which is considered to be non-woven, all traces of fats, waxes, oils, etc., should be removed by defatting or solvent extraction. Leather fiber is also suitable especially when felted either alone or in conjunction with other fibers.

Mated to the non-bonded protein fabrics or felts is at least one layer of a continuous proteinaceous film. The continuous proteinaceous film may comprise a collagenous material such as water-soluble glue or gelatin. Gelatin is preferred because of its great strength and lower fat content. However, removal of fat or other emulsified impurities in glue products renders the said glue product entirely suitable. Other proteinaceous materials, capable of providing a continuous proteinaceous film, are useful but not as advantageous as glue or gelatin. Egg albumen, casein, soya or zein proteins are useful but the greater film strengths of gelatin and glue encourage a preference for the latter.

In order to maintain adequate flexibility, the thinnest possible, yet continuous, proteinaceous film is desired. The fabric may be applied to one or both sides of the gelatin film to form, when dry, inner films ranging from .0001 to .001 of an inch in thickness. The thickness of the final product will depend not so much on the thickness of the gelatin film, for example, but rather on the thickness of the fabric support. Thus the thickness of the final product may vary from .03125 to .125 of an inch or even thicker. At this time it should be mentioned that the products of this invention include laminates containing more than one continuous proteinaceous film layer and more than one non-bonded fabric layer. In addition, the laminates may consist of one or more layers of other materials. For example, metallic foil such as copper, aluminum, tin, gold, platinum, etc., may be laminated to the continuous protein film or to laminates of the continuous protein film and the non-bonded fabric.

While the continuous film is supported on either or both sides by means of the fibrous fabric material, the continuous protein film must not penetrate beyond a minimum extent as flexibility is of prime importance. Since excessive penetration is to be avoided, all natural absorptive properties of the fabric must be minimized. This is done by treatment of the surface with an antiwetting agent and preferably a waterproofing composition. Examples of such antiwetting agents include the silicones, and stearato chromic salts (Quilon) or other moisture-proofing agents. Any antiwetting material is usable so long as it does not contribute to excessive bonding of the fabric support.

In carrying out the invention, a continuous sheet of film of glue or gelatin is mated to the non-bonded protein fabric. After the application of the fabric layer to the continuous protein film layer, to either one or both sides, the product is subjected to pressure, usually in a heated atmosphere. This step is best carried out at a temperature below the decomposition temperature of the protein involved. The pressure applied to form the films and laminates will vary, and in general, the higher the pressure, the less temperature is required. Extreme pressures should not be used as such pressures tend to saturate the fabric material with the continuous proteinaceous film resulting in a less flexible product. A mist of moisture may be sprayed on the continuous protein layer, prior to mating, to produce a locally-increased moisture content. Such locally-increased moisture content is of definite value when attempting to combine the continuous proteinaceous film with the layer of protein fabric. Similarly, the surface of the fabric support may be sprayed with a mist or even maintained at an elevated humidity so as to erect a bonding at the temperature and pressure used.

While the use of non-bonded, woven or non-woven fabric results in an extremely flexible product, it should be realized that the flexibility of the final product may be further controlled by incorporating into the gelatin or glue composition any of the well-known softening agents. In general, the glue or gelatin softeners are recommended. These are the polyols selected from the class comprising polyhydric materials containing about 2-8 carbons and about 2-8 hydroxyl groups with the understanding that there is one or less hydroxyl group for each carbon atom. Examples of the polyhydric materials include glycerol and the glycols, such as 1,2-ethylene glycol and 1,3-propylene glycol, and the polyglycols, sorbitol, and other related polyols. Also included are the invert or hydrolyzed sugars. Usually 50 to 100 parts of plasticizer per 100 parts of glue or gelatin may be used. However, in some instances, larger amounts, of about 200 parts per 100 parts of protein, have utility.

In addition to the above named plasticizers, a wide range of other additives may be added to the glue or gelatin compositions to promote changes in the fluidity, gel strength, rate of gelation, insolubilization, etc. However, no additive should be mixed in which would increase the permeability of the gelatin layer to high-fugacity gases.

The following examples are presented to illustrate the invention. It will be understood that these examples are illustrative and should not be taken in any manner as limiting the invention as defined in the appended claims.

EXAMPLE I

A 0.1 mil thick film of gelatin was placed between two fabric layers of woven wool of about 2 mil thickness each. A mist of moisture was sprayed on the fabric to produce a locally increased moisture content so as to aid in the superficial bonding of the layers. The three layers were then laminated by means of pressure rollers under a pressure of about 30 p.s.i. and at a temperature of 50° C. The resulting laminate did not rupture when flexed at the temperature of liquid nitrogen and exhibited excellent impermeability to high-fugacity gases.

EXAMPLE II

A continuous sheet of non-bonded fabric made from feather fiber was treated with a silicone moisture repellant. The continuous sheet of fabric was chilled to −4° C. to promote the gelation of a gelatin solution. A gelatin solution comprising 5 grams of gelatin per 100 grams of water was sprayed on the fabric. The product was dried in a stream of air at a temperature of 25° C. for 10 minutes. The final produrt possessed excellent impermeability to oxygen and did not rupture when flexed at temperatures below minus 250° C.

EXAMPLE III

A 2–5% gelatin solution was extruded through a chilled die so as to yield a continuous film of gelatin gel. This continuous film was layered on a non-bonded sheet of hair fiber and dried in cold air. A second layer comprising non-bonded woven silk was dampened with a spray of moisture and placed on the free gelatin side and the entire product laminated under 100 p.s.i. by means of rollers having a temperature of about 50° C.

EXAMPLE IV

A 1 mil thick sheet of defatted leather was superficially bonded, by means of pressure, to a 0.1 mil layer of gelatin. The leather side of the latminate was then mated with a 0.2 mil coating of 540 grams. Bloom test hide glue containing 10% glycerine, basis glue. The laminate was passed through a dryer and adhered to another 1 mil thick sheet of defatted leather by means of pressure. The total four layer sheet now comprising gelatin-leather-glue-leather was wax coated to produce an excellent moisture-proof film material having excellent impermeability to gases of high fugacity.

EXAMPLE V

Two sheets of non-bonded wool felt were superficially bonded with an aqueous gelatin solution containing 10% gelatin and 2% glycerine. Hot pressure rolls (120° C.) completed the lamination so that the gelatin layer was less than 0.2 mil thick. The gas-impermeable laminate was then coated with a nitrocellulose lacquer on both sides to import moisture resistance.

EXAMPLE VI

A 2-5% gelatin solution was extruded through a chilled die so as to yield a continuous film of gelatin gel. This continuous film was layered on a non-bonded sheet of hair fiber and dried in cold air. It was then sprayed with a heat coagulable albumen solution (egg) and before drying a second layer comprising a .0001 inch thick platinum foil sheet was placed over the moist albumen solution and the entire product laminated under 50 p.s.i. by means of rollers having a temperature of about 100° C. The resulting laminate did not rupture when flexed at temperatures approaching that of liquid helium, namely minus 269° C.

It is apparent that many modifications and variations of the invention as hereinbefore set forth may be made without departing from the spirit and scope thereof. The specific embodiments described in the examples are given by way of illustration and the invention is to be limited only by the terms of the appended claims.

I claim:

1. A method of producing a laminate exhibiting flexibility at cryogenic temperatures comprising: treating a proteinaceous fabric substantially free of sizing and bonding agents with an anti-wetting agent; placing the non-bonded, proteinaceous fabric on a continuous film of solidified protein to form a laminate therewith; and applying only a minimum pressure up to about 100 p.s.i. to said fabric and film to produce a superficial bonding therewith whereby a laminate is produced exhabiting flexibility at cryogenic temperatures and substantial impermeability to gases of high fugacity.

2. The method of claim 1 wherein the proteinaceous fabric is selected from the group consisting of wool, silk, hair, leather, feather fibers and combinations thereof, and the protein film is selected from the group consisting of glue, gelatin, egg albumen, soya proteins, zein proteins and collagen.

3. As an article of manufacture, a laminate which is flexible at cryogenic temperatures, yet substantially impermeable to gases of high fugacity, which laminate comprises: superficially bonded layers of at least one layer of a non-bonded, proteinaceous fabric and at least one continuous proteinaceous film layer, said layers having been applied in such a way that a minimum amount of surface penetration is effected.

4. The article of manufacture of claim 3 wherein the proteinaceous fabric layer is selected from the group consisting of wool, silk, hair, leather, feather fibers and combinations thereof and the protein film is selected from the group consisting of glue, gelatin, egg albumen, soya proteins, zein proteins and collagen.

5. The article of manufacture of claim 4 wherein the superficially bonded layers comprise at least one additional layer consisting of metallic foil.

References Cited

UNITED STATES PATENTS

| | | | |
|---|---|---|---|
| 1,407,197 | 2/1922 | Johnston | 161—227 XR |
| 126,851 | 5/1872 | Taylor | 117—164 |
| 643,594 | 3/1900 | Crowell | 117—164 X |
| 1,470,352 | 10/1923 | Dubbs | 92—103 X |
| 1,779,388 | 10/1930 | Calvert | 161—227 |
| 2,600,388 | 6/1952 | Beckel et al. | 161—226 X |
| 2,836,963 | 6/1958 | Fox | 92—47 X |

EARL M. BERGERT, *Primary Examiner.*

D. J. FRITSCH, *Assistant Examiner.*

U.S. Cl. X.R.

161—226; 156—336; 92—103